United States Patent

Reiter et al.

[11] Patent Number: 5,387,287
[45] Date of Patent: Feb. 7, 1995

[54] APPARATUS FOR HOLDING SOLID COMPACT MEDICAMENTS DURING PROCESSING

[75] Inventors: Thomas C. Reiter, Hilton; Peter A. Pastecki; Charles W. Pierson, both of Rochester, all of N.Y.

[73] Assignee: Eastman Kodak Company, Rochester, N.Y.

[21] Appl. No.: 88,501

[22] Filed: Jul. 7, 1993

[51] Int. Cl.$^6$ .......................... B05C 13/00; B25B 1/20; B23Q 3/00; A61K 9/00
[52] U.S. Cl. ........................... 118/503; 269/43; 269/254 CS; 269/156; 269/268
[58] Field of Search ................... 118/500, 503; 269/43, 269/268, 254 CS, 156, 287; 427/3

[56] References Cited

U.S. PATENT DOCUMENTS

| Re. 33,251 | 7/1990 | Wittwer et al. | 156/275.1 |
|---|---|---|---|
| 1,428,868 | 9/1922 | Veckert | 269/254 CS |
| 1,872,190 | 8/1932 | Sindl | . |
| 2,443,574 | 6/1948 | Burns | 269/254 CS |
| 2,559,958 | 7/1951 | Herts et al. | 118/503 |
| 2,727,325 | 12/1955 | Jurinic | 41/4 |
| 3,045,641 | 7/1962 | Oddo | 118/503 |
| 3,896,762 | 7/1975 | Banker | 118/30 |
| 3,927,195 | 12/1975 | Messora | 424/21 |
| 4,288,065 | 9/1981 | Braverman | 269/43 |
| 4,350,279 | 9/1982 | Haley | 269/254 CS |
| 4,510,168 | 4/1985 | Sakashita et al. | 427/3 |
| 4,522,666 | 6/1985 | Wittwer | 156/69 |
| 4,532,881 | 8/1985 | Sakashita et al. | 118/20 |
| 4,650,379 | 3/1987 | Jaskolski | 269/43 |
| 4,724,019 | 2/1988 | Brown et al. | 156/69 |
| 4,805,889 | 2/1989 | Liepse | 269/210 |
| 4,807,421 | 2/1989 | Araki et al. | 269/287 |
| 4,821,393 | 4/1989 | Spigarelli | 269/254 CS |
| 4,867,983 | 9/1989 | Berta | 424/451 |
| 4,900,586 | 2/1990 | Kanamori et al. | 427/125 |
| 4,921,108 | 5/1990 | Berta | 209/625 |
| 4,940,499 | 7/1990 | Lebrun et al. | 156/69 |
| 4,965,089 | 10/1990 | Sauter et al. | 427/3 |
| 4,966,771 | 10/1990 | Berta | 424/478 |
| 4,990,358 | 2/1991 | Berta | 427/3 |
| 5,032,074 | 7/1991 | Muto et al. | 425/272 |
| 5,112,559 | 5/1992 | Lebrun | 264/297.8 |

FOREIGN PATENT DOCUMENTS

| 2259387 | 6/1974 | Germany | A61K 9/04 |
|---|---|---|---|
| 992241 | 5/1965 | United Kingdom | A61J 3/06 |

Primary Examiner—Robert J. Warden
Assistant Examiner—Christopher Y. Kim
Attorney, Agent, or Firm—Carl F. Ruoff

[57] ABSTRACT

An apparatus for holding a solid compact medicament has relatively displaceable, substantially planar first and second members having opposed edge portions. Each edge portion has at least one notch having an interior wall. Housing is provided for holding members in a substantially co-planar relationship. When members are displaced, preferably along a fixed axis, to a first position, the interior walls of the opposed, aligned notches define an open gripping jaw for receiving and subsequently releasing the caplet. Further, when members are displaced to a second position, the open gripping jaw then partially closes, thereby capturing the caplet securely within the notches in the gripping jaw for processing.

16 Claims, 6 Drawing Sheets

FIG. 2
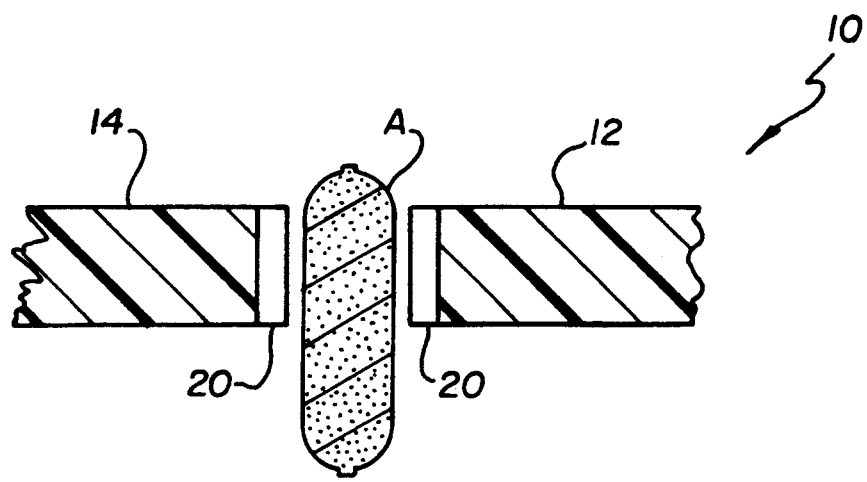
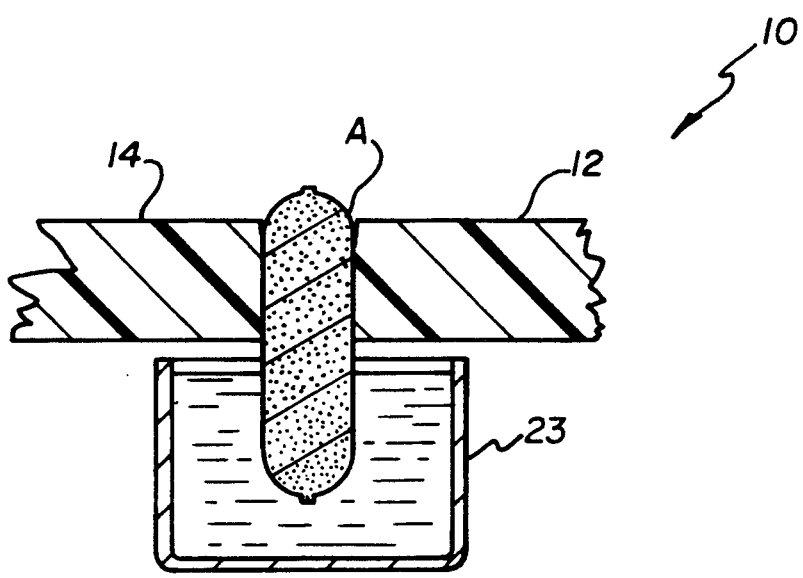
FIG. 3

APPARATUS FOR HOLDING SOLID COMPACT MEDICAMENTS DURING PROCESSING

FIELD OF THE INVENTION

The invention relates to an apparatus for holding a solid compact medicament during processing. More particularly, the invention concerns a solid compact medicament holding apparatus in which overlapping portions of the medicament, such as a caplet, are exposed to a coating process to produce a coated solid compact medicament which resembles a conventional capsule.

BACKGROUND OF THE INVENTION

In the marketing of solid compact medicaments, there is a clear consumer preference for a shiny, capsule-like, single or multiple color solid dosage form that is easy to swallow. Generally, gelatinous coatings have been used to achieve a shiny surface on a solid dosage form, also referred to herein as a caplet, pill, tablet, and the like. Caplets are solid, substantially cylindrical shaped medicaments; pills are solid, substantially round shaped medicaments; and, tablets are solid, substantially spherical shaped medicaments (see for reference Seitz et al., "Tablet Coating," Chapter 12, Page 346, *The Theory and Practice of Industrial Pharmacy*). One method of making caplets which has been used to meet the needs of the pharmaceutical consumer is described and illustrated in U.S. Pat. No. 4,965,089 to Sauter et al, and U.S. Pat. Nos. 4,990,358 and 4,921,108, both to Berta et al. In particular, Sauter '089 and Berta '358 each teaches a method and apparatus for holding and dipping one end portion of a caplet into a gelatin pool and then positioning the caplet so as to dip the uncoated end portion of the caplet into a second gelatin pool of a different color. However, a major drawback of the apparatus and methods taught in these patents is that a constant force spring is relied upon to hold the caplet during the dip coating process and also during caplet transfer to other processing steps, such as drying and packaging. As can be readily appreciated, such a constant spring force could impart a shear force which would be unacceptably large on some abrasion sensitive material included in solid compact medicaments. Acetyl salicylic acid, also known as aspirin, and gelatinous coatings which have not been completely cured, are two examples of abrasion sensitive materials which could be damaged by such shear force.

Furthermore, since existing caplet holders generally rely upon a constant force spring for holding the caplet, they require some sort of mechanical force to load the caplet into and discharge the caplet from the holder, thereby potentially compromising the integrity of the caplet material. For instance, Sauter '089 and Berta '108, each teaches a caplet loading device having a caplet feeder associated with a plunger assembly for mechanically loading and unloading caplets.

Accordingly, there persists a need for a reliable, relatively low maintenance apparatus having few moving parts for holding and releasing a solid compact medicament during processing which does not impart an unacceptably large shearing force on the solid compact medicament, subject the solid compact medicament to lubricant contamination, nor rely upon excessive forces to release the solid compact medicament from the apparatus.

SUMMARY OF THE INVENTION

It is, therefore, the object of the present invention to overcome the problems of the prior art. Accordingly, for solving one or more of the problems above, there is provided, in one aspect of the invention, an apparatus for holding a solid compact medicament during processing which comprises first and second members having opposed edge portions. Each edge has at least one notch opposed to and aligned with a notch in the other edge with the notches each having an interior wall. The members are relatively displaceable between a first and a second position. In the first position, the interior walls of the opposed notches define an open gripping jaw for receiving and subsequently releasing the solid compact medicament. In the second position, the open gripping jaw at least partially closes to capture a circumferential portion of the solid compact medicament to be coated. Finally there is provided means for holding the members with the gripping jaw open or at least partially closed.

In another aspect of the invention, an apparatus has the features described above including means, cooperating with the gripping jaw, for precisely positioning a predetermined portion of the solid compact medicament for processing; and, means, cooperating with the first and second members, for urging the medicament from the gripping jaw.

BRIEF DESCRIPTION OF THE DRAWINGS

The foregoing as well as other objects, features and advantages of this invention will become more apparent from the appended Figures, wherein like reference numerals denote like elements, and wherein:

FIG. 2 is an elevated side view along line 2—2 of FIG. 1 of the apparatus showing the plates in the second, open position;

FIG. 3 is an elevated side of the apparatus showing the plates in the first, partially closed position;

DETAILED DESCRIPTION OF THE DRAWINGS

Figure 1:
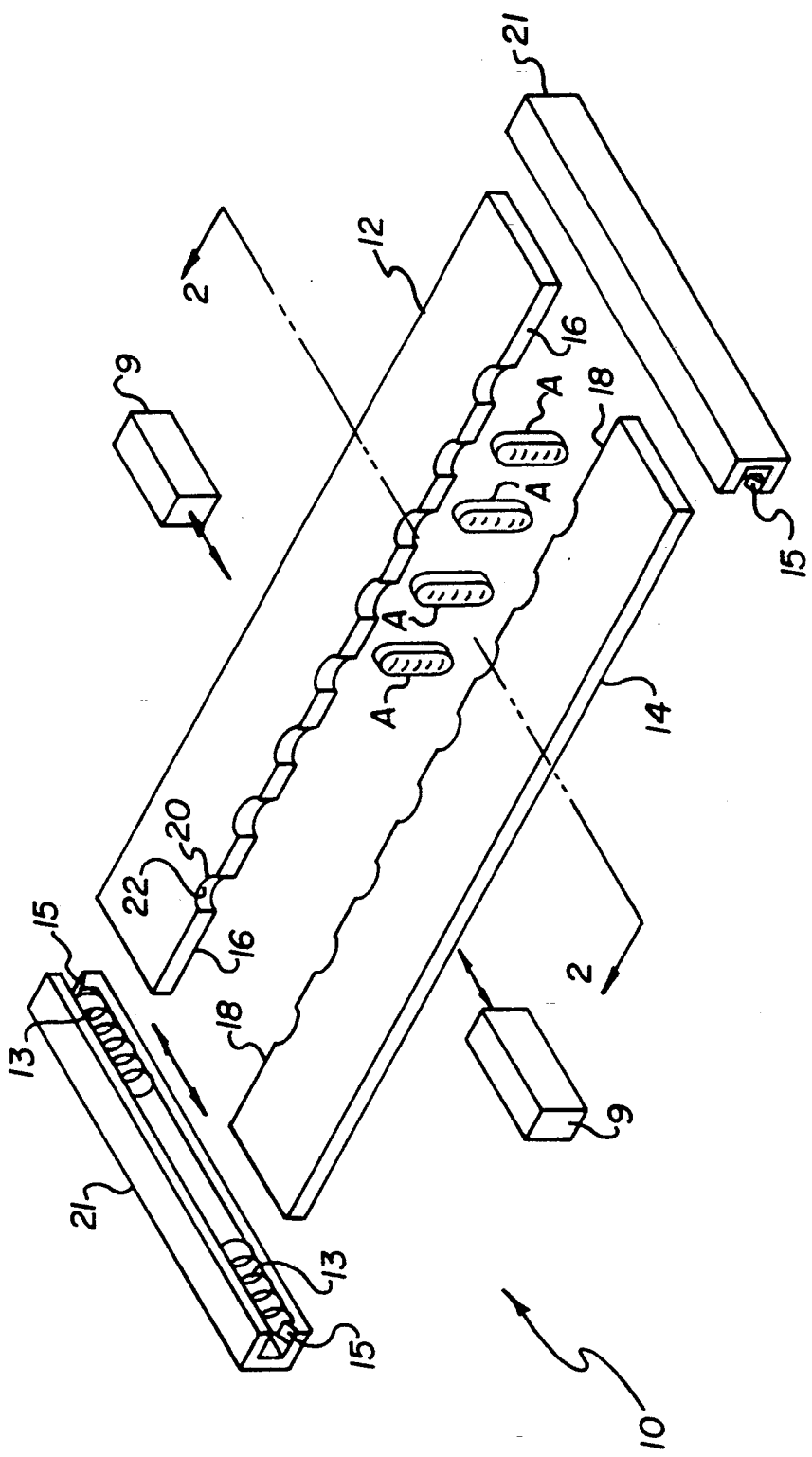
FIG. 1 is an exploded view of the apparatus according to the principles of the invention.

Turning now to the drawings, and more particularly to FIG. 1, there is shown apparatus 10 for holding a caplet (A) during processing which comprises the preferred embodiment of the invention. Processing of caplets, i.e., the uncoated solid dosage form, generally involves coating (typically dipping or spraying) at least a portion of the caplet. Often one or more layers of clear or colored materials are used in the coating process, for instance, gelatinous materials such as methyl cellulose, calcium alginate or gelatin (See Berta '771). The coated caplet then must be dried and packaged. When one or more coating materials are to be applied to different portions of the caplet, for instance different colored materials on opposite end portions of the caplet, processes are required for exposing and then coating the uncoated caplet end portion. This generally will involve either forcing the caplet through a collet in the manner described in the prior art devices of both Sauter '089 and Berta '358 or, inverting the apparatus of the present invention, as more fully described below, and allowing the caplet to fall freely to a predetermined stop thereby exposing an uncoated portion of the caplet.

Referring again to FIG. 1, apparatus 10 of the invention for holding a solid compact medicament (A) during processing is shown broadly comprising displaceable first and second members 12,14 having opposed edge portions 16,18. Edge portions 16,18 each comprises at least one correspondingly aligned opposed notch 20, each notch 20 having an interior wall 22. Interior walls 22 of opposed notches 20 form a gripping jaw 24 (described more fully below) for receiving, holding and subsequently releasing a circumferential portion of caplet (A) during processing. A housing 21 may be used to retain members 12,14 in a substantially parallel relations. End members 15 anchoring spring member 13 in housing 21 are preferably used also for limiting the relative displacement between first and second members 12,14. Alternatively, members 12,14 may be retained in alignment with retaining members (not shown) mounted on at least one end of first and second members 12,14.

FIGS. 2 & 3 show members 12,14 relatively displaced from one another along an axis (indicated by arrows in FIG. 1). According to FIG. 2, first and second members 12,14 are displaced to a first position with gripping jaw 24 open for receiving and subsequently releasing a solid compact medicament (A). As shown in FIG. 3, members 12,14 are displaced to a second at least partially closed position with caplet (A) engaged firmly in opposed notches 20 of gripping jaw 24 for processing.

Any means for displacing members 12,14, preferably along a fixed axis, in housing 21 can be used. Cooperating spring member 13 and first drive means 9 (such as a motor drive) are preferred for displacing members 12,14, although those skilled in the art could use other devices such as retractably forcing oversized pins into a dummy gripping jaw thereby forcing apart opposing notches 20 (not shown). Spring member 13, in the preferred embodiment, is also required for maintaining a constant pressure on first and second members 12,14, and therefore on the caplet (A), throughout a processing cycle. Drive means 9, in this embodiment, urges plate members 12,14 into spring 13 thereby biasing members 12,14 for receiving and releasing a caplet. When the pressure imposed by the first drive means 9 on members 12,14 is released, the caplet (A) is enabled to partially fall through open gripping jaw 24 and come to rest with the uncoated end downwardly exposed as illustrated. The caplet (A) is then in position for another processing cycle.

Skilled artisans will appreciate that spring members 13 need not be included in both sides of the housing 21 (as shown in FIG. 1) to enable the apparatus 10 to perform its function of opening and releasing the solid compact medicament. Moreover, it is considered within the contemplation of the invention to have members 12 and 14 pivot away from one another with opposed notches 20 in an open position for receiving and subsequently releasing a caplet, and toward each other with opposed notches 20 in the closed position for capturing a caplet (not shown).

Furthermore, those skilled in the art will appreciate that members 12,14 may comprise a plurality of opposed notches 20 (as previously described and shown in FIG. 1) forming a plurality of gripping jaws 24 for capturing and releasing caplets (A) during processing, although at least one gripping jaw 24 satisfies the requirements of the invention.

Moreover, one skilled in the art will appreciate that a plurality of apparatus 10 (not illustrated), as described above, for holding and processing caplets (A) may be combined to function in accordance with the requirements of the invention.

Turning again to FIG. 3, members 12,14 are shown with a circumferential portion of the caplet (A) engaged firmly in opposed notches 20 of gripping jaw 24 as described above. Hence, caplet (A) is in captured engagement with gripping jaw 24 and, the downwardly exposed end portion of the caplet (A) can be partially treated or processed without movement, for instance in a coating vat 23, as illustrated.

Figure 4:
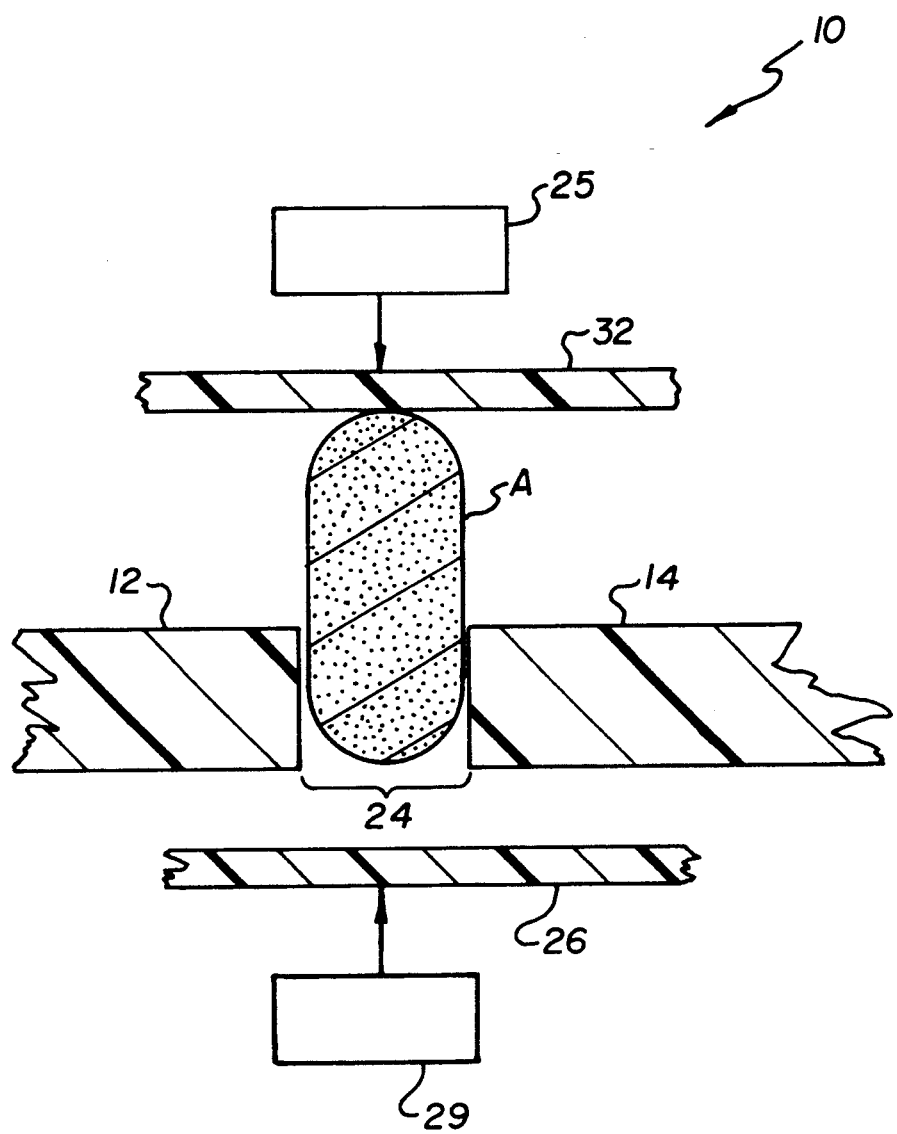
FIG. 4 is an enlarged section view of an alternative embodiment of the apparatus.

Turning now to FIG. 4, in another embodiment of the invention, apparatus 10 is shown comprising means for precisely positioning a predetermined portion of the caplet (A) for processing. In this embodiment, preferably a stop plate 26 positioned beneath gripping jaw 24 is used to precisely position a predetermined portion of the caplet (A) for processing. Alternatively, means (as described below) for initiating disengagement of article (A) from gripping jaws 24 may be used cooperatively with stop plate 26. In this later instance, it is conceivable that a small percentage of caplets (A) may have difficulty falling through the open gripping jaw 24 due to a variety of reasons such as sticking or sizing irregularity, and therefore, the reluctant caplet will require some initial modest forcing, as discussed further below.

Figure 6:
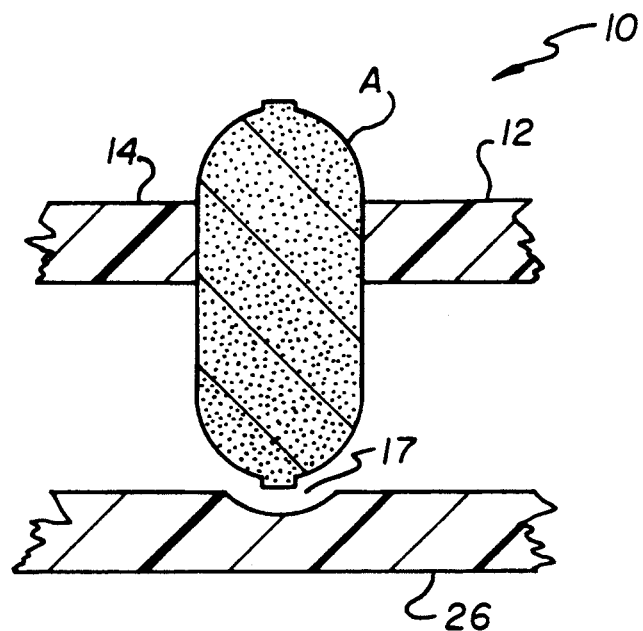
FIG. 6 is an enlarged section view of the apparatus showing a captured caplet positioned above an alternative stop plate having a depression aligned beneath the gripping jaw; and, FIG. 7 is the enlarged section view of the apparatus of FIG. 6 showing an end portion of the caplet resting in the depression.
Figure 7:
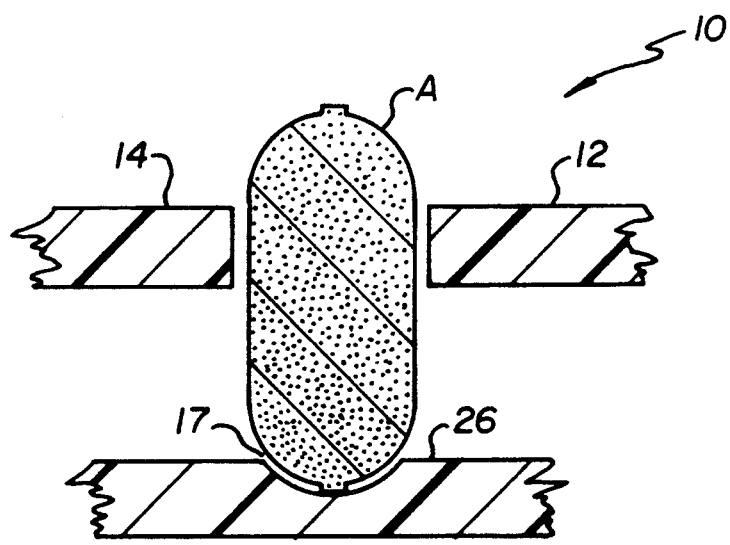

In FIGS. 4, 6 & 7, stop plate 26 is positioned beneath the lengthwise axis of gripping jaw 24 so that solid compact medicaments of various lengths and coating formats can be accommodated. According to FIGS. 6 & 7, stop plate 26 comprises preferably a depression 17 shaped to correspond with an end portion of the solid compact medicament (A). Depression 17 serves to minimize lateral movement or bouncing of the caplet upon contact with stop plate 26. Alternatively, stop plate 26 may be substantially flat as shown in FIG. 4. Further, stop plate 26 is movably adjustable, preferably under the influence of second drive means 29 (FIG. 4), relative to gripping jaw 24. Other means within the definition of the invention may be used for adjusting the position of stop plate 26 relative to gripping jaw 24.

Some small number of caplets (A) may require urging to fall through the open gripping jaw 24 during, for instance, large batch processing. To initiate disengagement of a reluctant caplet (A) from an open gripping jaw 24, a bar-like member 32 is preferably used. According to FIG. 4, bar-like member 32 is positioned above the gripping jaw 24 and is brought into pressing contact, preferably under the influence of a third drive means 25, with an end portion of the caplet (A). In this manner, the downward displacement of caplet (A) through gripping jaw 24 is initiated, and once initiated, the caplet (A) resumes its downward fall through open gripping jaw 24 without the requirement of additional force. Those skilled in the art will appreciate that other means may be used for initiating displacement of solid compact medicament (A) downwardly through gripping jaw 24, such as, by vibration means, air pressure or vacuum.

Figure 5C:
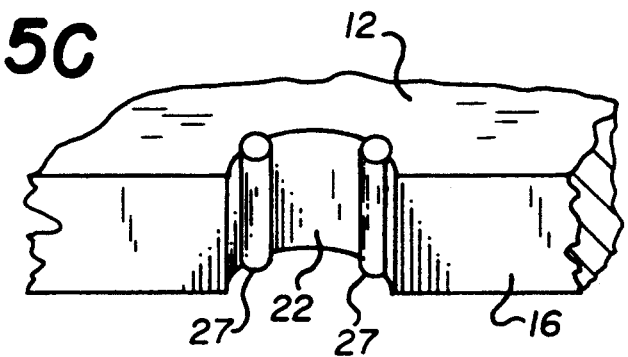
FIG. 5c is an enlarged fragmentary view of the interior wall of FIG. 5a having another retaining means therein.
Figure 5B:
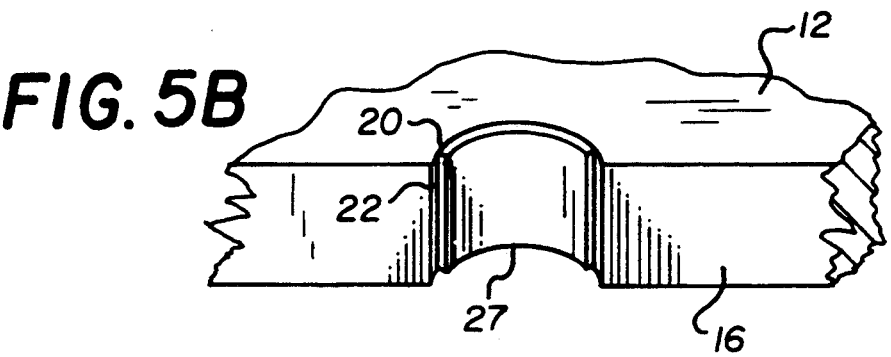
FIG. 5b is an enlarged fragmentary view of the interior wall of FIG. 5a having an alternative solid compact medicament retaining means therein.
Figure 5A:
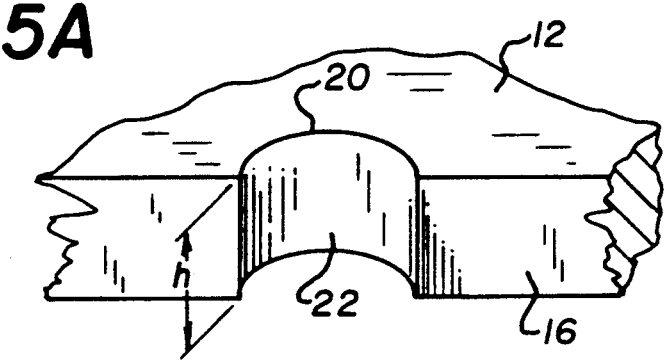
FIG. 5a is an enlarged fragmentary view of the interior wall of one member.

FIG. 5a shows an enlarged view of interior wall 22 of notch 20 in first member 12. In the preferred embodiment of the invention, members 12,14 have substantially similar interior walls 22. Generally, interior wall 22 has a relatively arcuate surface conforming at least partially to a circumferential portion of the solid compact medicament. Interior wall 22 may, however, have just about any shape which will enable the gripping jaw 24 formed by interior walls 22 in opposed notches 20, as previously described, to firmly capture the caplet (A) for processing. While the relative height (h) of the interior wall 22 compared to the length of the solid compact medicament (A) contained in the gripping jaw 24 is generally not an important factor in the operation of the apparatus 10 of the invention, experience indicates that a thick interior wall 22 (e.g., the height (h) is twice the length of the caplet) favors dimensional stability of members 12,14. In this case, members 12,14 are less likely to flex under there own weight during operation. On the other hand, thin interior walls 22 favor reduced weight, ease of cleaning and storage, and a generally more economical apparatus 10.

Figure 5D:
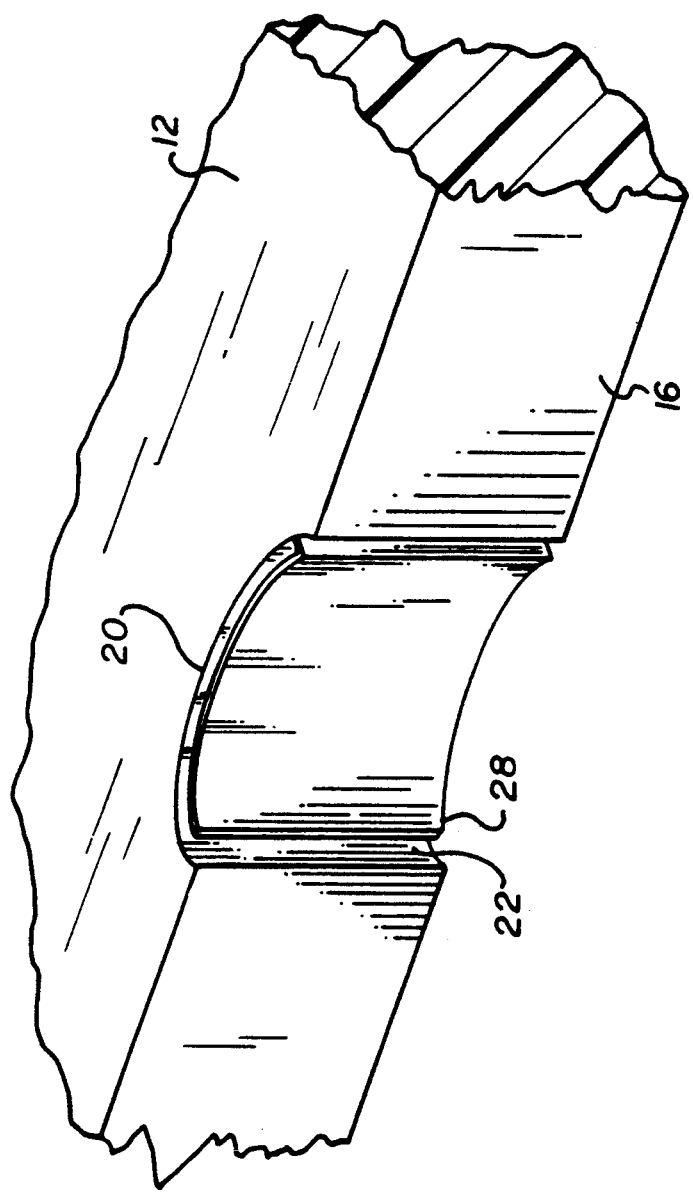
FIG. 5d is an enlarged fragmentary view of the interior wall of FIG. 5a having yet another retaining means therein.

FIGS. 5b and 5c show interior wall 22 in an alternative embodiment of apparatus 10. According to FIG. 5b, interior wall comprises at least a partial layer 27 of compliant material mounted thereon. Alternatively in FIG. 5c, at least three strips of compliant material (two compliant strips shown on one interior wall only) arranged on opposing interior walls 22 of gripping jaw 24 provides sufficient point contact and security for the solid compact medicament captured in the gripping jaw 24. Layer 27 is preferably adhesively mounted onto interior wall 22 or it may be mounted by any suitable means such as with clips or bolts. While just about any compliant material layer 27 may be used, the inventors generally prefer a moldable thermoplastic rubber material, such as Santoprene ® made by Monsanto Corporation of St. Louis, Mo. According to FIG. 5d, in another embodiment, at least one interior wall 22 comprises a tension means, such as a flexible spring member 28, forming a cusp for grasping a portion of solid compact medicament (A).

Accordingly, an important advantageous effect of the present invention is that it provides a reliable, low maintenance, economical apparatus for holding, and subsequently releasing a solid compact medicament during processing without contaminating or damaging the solid compact medicament.

The invention has therefore been described with reference to certain embodiments thereof, but it will be understood that variations and modifications can be effected within the scope of the invention.

Parts List

Caplet/Solid Compact med. A
First Drive Means 9
Apparatus 10
First and Second Members 12,14
Spring Member 13
Stop Member 15
Depression 17
Edge Portions 16,18
Notch 20
Housing 21
Interior Wall 22
Coating Vat 23
Gripping Jaw 24
Second Drive Means 25
Stop Plate 26
Layer 27
Third Drive Means 29
Spring Member 28
Bar-like Member 32

Having described our invention in sufficient detail to enable those skilled in the art to make and use it, we claim and desire to secure Letters Patent of the United States for:

1. Apparatus for holding at least a portion of a solid compact medicament during processing including coating, the apparatus comprising:

first and second substantially parallel, planar members, said members having opposed edge portions each of said edge portions having at least one notch opposed to and aligned with a notch in the other edge, said notches each having an interior wall;

an urging means cooperatively associated with said first and second members for displacing said members relative to one another between a first position wherein said interior walls of said opposed notches define an open gripping jaw for receiving and subsequently releasing said solid compact medicament, and a second position wherein said open gripping jaw closes upon and thereby captures a circumferential portion of said solid form medicament to be coated and exposes another portion of said medicament for coating; and, means for holding said members in a substantially parallel and planar relationship when said gripping jaw is in said first or second position.

2. The apparatus recited in claim 1 wherein said first and second members are displaceable along a fixed axis.

3. The apparatus recited in claim 1 further comprising means, cooperating with said gripping jaw, for positioning a predetermined portion of the caplet for processing.

4. The apparatus recited in claim 3 wherein said positioning means is a stop plate spaced a predetermined distance from said gripping jaw.

5. The apparatus recited in claim 3 wherein said stopping plate is adjustable relative to said gripping jaw.

6. The apparatus recited in claim 3 wherein said stop plate is provided with a depression aligned with the longitudinal axis of the gripping jaw.

7. The apparatus recited in claim 6 wherein said depression is sized to accommodate an end portion of the solid compact medicament.

8. The apparatus recited in claim 1 further comprising means cooperating with said first and second members for initiating disengagement of the solid compact medicament from said gripping jaw.

9. The apparatus as recited in claim 8 wherein said initiating means is a bar member or air pressure.

10. The apparatus recited in claim 1 wherein said interior wall of at least one of said notches is provided with means for compliantly engaging the compact medicament.

11. The apparatus recited in claim 10 wherein said means for compliantly engaging is a rubber material.

12. The apparatus recited in claim 1 further comprising means, cooperating with said members, for movably displacing said members from said first to said second position.

13. An apparatus for holding at least a portion Of a solid compact medicament during processing including coating, the apparatus comprising:

first and second substantially parallel, planar members, said members having opposed edge portions, each edge having at least one notch opposed to and aligned with a notch in the other edge, said notches each having an interior wall, and wherein said interior wall of at least one of said notches is provided with means for compliantly engaging said solid compact medicament;

an urging means cooperatively associated with said first and second members for displacing said members relative to one another along a fixed axis between a first position wherein said interior walls of said opposed notches define an open gripping jaw for receiving and subsequently releasing said solid compact medicament, and a second position wherein said open gripping jaw closes upon and thereby captures a circumferential portion of said solid form medicament and thereby exposes another portion of said solid compact medicament for coating;

means for holding said members with said gripping jaw open in said first or second positions;

means, cooperating with said gripping jaw, for precisely positioning a predetermined portion of the solid compact medicament for processing; and, means, cooperating with said first and second members, for urging said solid compact medicament from said gripping jaw.

14. The apparatus recited in claim 13 wherein said positioning means is a stop plate spaced a predetermined distance from said gripping jaw.

15. The apparatus as recited in claim 13 wherein said urging means is a bar member or air pressure.

16. The apparatus recited in claim 13 wherein said means for compliantly is a rubber material.

* * * * *

UNITED STATES PATENT AND TRADEMARK OFFICE
CERTIFICATE OF CORRECTION

PATENT NO. : 5,387,287
DATED : February 7, 1995
INVENTOR(S) : Thomas C. Reiter, et al.

It is certified that error appears in the above-indentified patent and that said Letters Patent is hereby corrected as shown below:

Column 7, line 7, delete "Of" insert --of--;

Column 8, line 22, before "is" insert --engaging--;

Signed and Sealed this

Twenty-sixth Day of August, 1997

Attest:

BRUCE LEHMAN

Attesting Officer     Commissioner of Patents and Trademarks